Dec. 15, 1953  V. SCHWARZKOPF  2,662,751
MILK FAT BLENDING APPARATUS
Original Filed Oct. 22, 1948  2 Sheets-Sheet 1
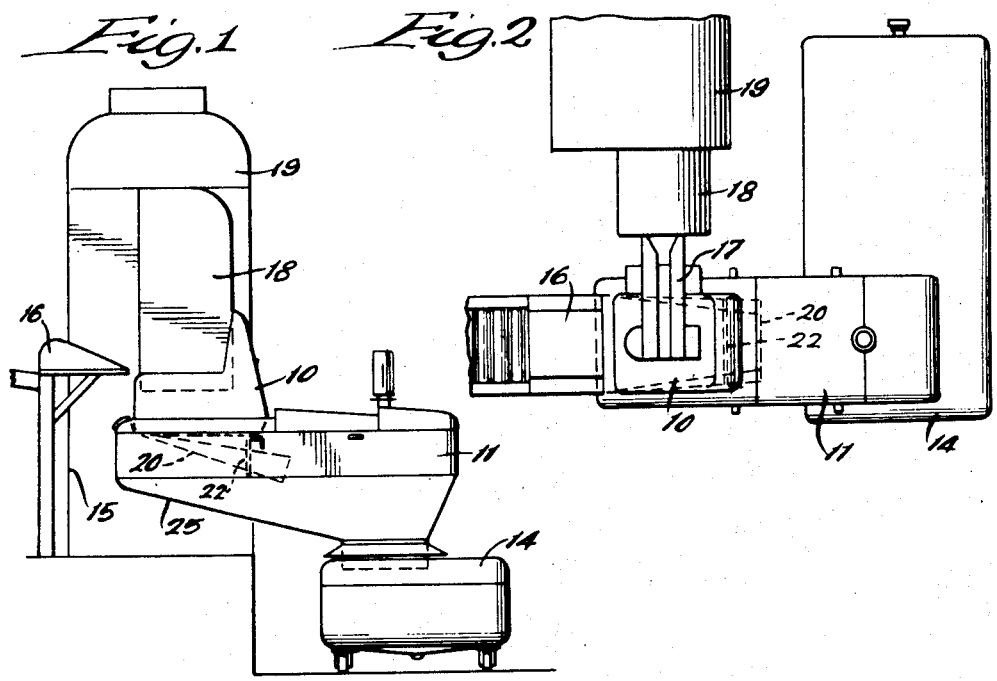
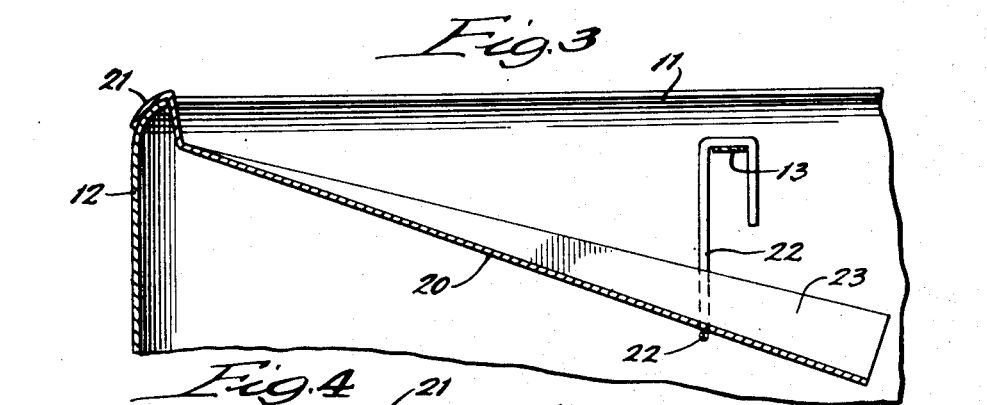
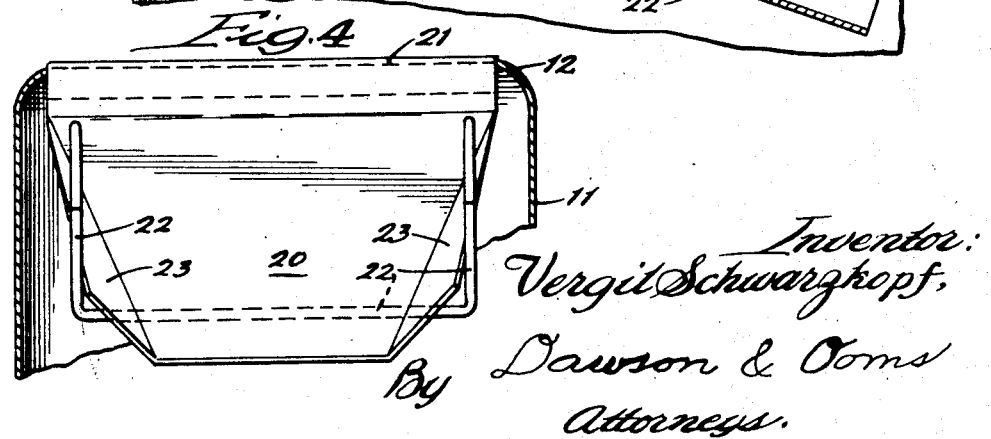
Inventor:
Vergil Schwarzkopf,
By Dawson & Ooms
Attorneys.

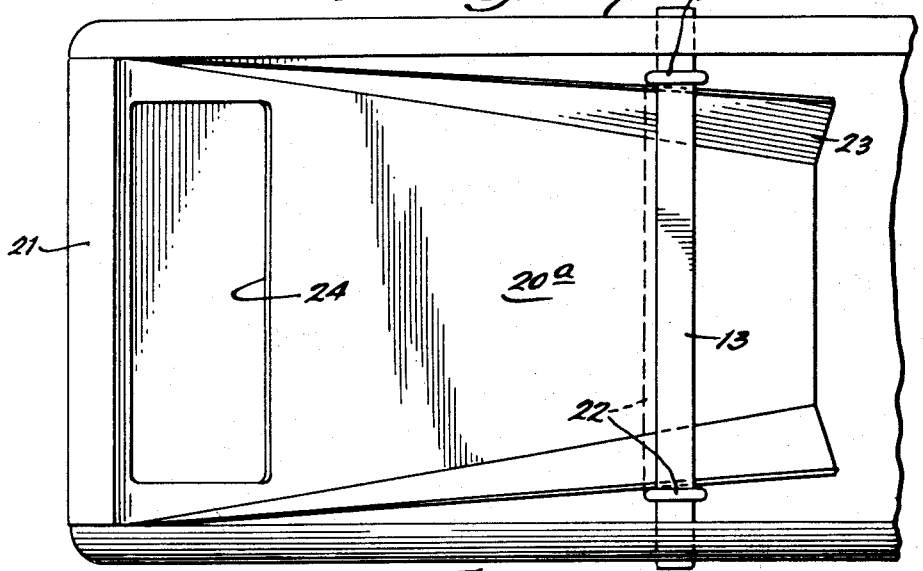
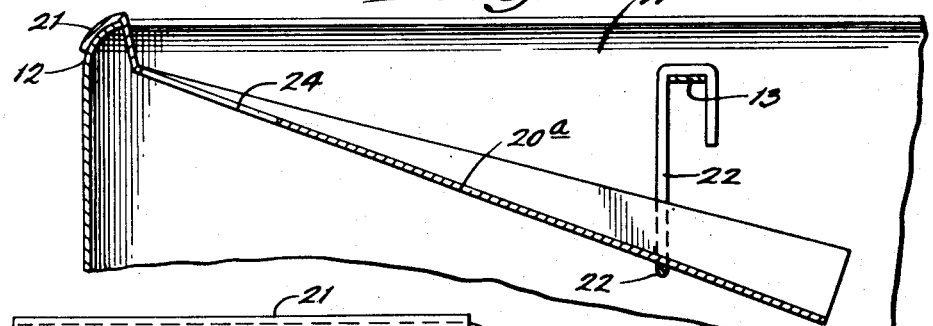
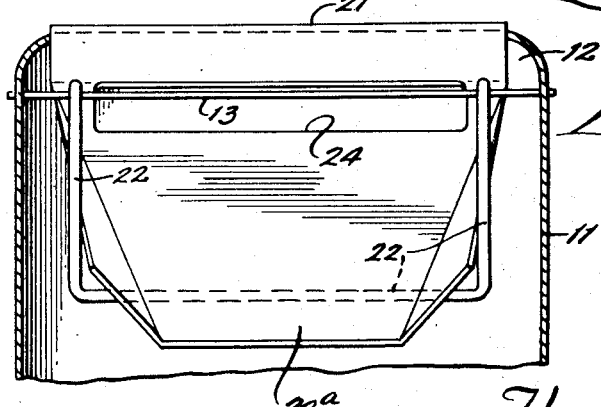

Patented Dec. 15, 1953

2,662,751

UNITED STATES PATENT OFFICE 2,662,751

MILK FAT BLENDING APPARATUS

Vergil Schwarzkopf, La Grange, Ill., assignor to The Lathrop-Paulson Company, Chicago, Ill., a corporation of Illinois Continuation of application Serial No. 56,005, October 22, 1948. This application September 13, 1951, Serial No. 246,476

3 Claims. (Cl. 259—4)

This invention relates to milk fat blending apparatus and is particularly useful in connection with a dump can equipped with a strainer and a weigh can into which the dump can empties. The present application is a continuation of my co-pending application, Serial No. 56,005, filed October 22, 1948, for Milk Fat Blending Apparatus, now abandoned.

It is the present practice to dump milk from conveyor lines into a dump can or hopper, having in its bottom or front portion a mesh strainer or sieve through which the milk escapes into the weigh can. The milk which has remained in the containers for some time prior to dumping tends to cream or layer off so that there is a cream layer or cream line in the can very similar to the cream layer or line in a milk bottle. When a can is dumped into the dump hopper, the cream is dumped first, followed by low testing or skim milk from the bottom of the can. Because of this separation or segregation of the fat in the milk, it becomes necessary to thoroughly mix or blend the milk in the weigh can in order to get a representative sample for butter fat test. Even though the milk falls into the dump can or hopper with considerable velocity, the strainer breaks up the body of the milk into a large number of small streams which fall into the weigh can without stirring or substantially moving the body of the milk within the weigh can. As a result of this practice, it is found that the butter fat in the milk is somewhat segregated and is found in greater quantity in one area of the body of milk within the weigh can than in another area. As a result, in taking samples of the milk in order to determine the amount to be paid the milk producer, nonrepresentative samples are obtained and the producer is paid too much or too little as a result of the nonrepresentative sample. There are further disadvantages resulting from the lack of blending of the butterfat uniformly within the milk body.

An object of the present invention is to provide means of extremely low cost which can be readily installed in a weigh can and which converts the fine milk streams from the strainer into a heavy liquid body that is channeled into the milk stream to produce an effective stirring of the milk and a blending of the butterfat uniformly therewith. A still further object is to provide in such a structure means for converging the collected liquid into a heavy body for discharging into the milk stream while at the same time utilizing a portion of the dropping milk for stirring the shallowest part of the milk body. A still further object is to provide removable apparatus which may be installed with weigh can equipment now in use for utilizing the strained milk in a stirring or blending action while at the same time effecting a uniform blending of the butterfat with the milk through an elongated container or weigh can. Other specific objects and advantages will appear as the specification proceeds.

The invention is illustrated, in preferred embodiments, by the accompanying drawings, in which—

Figure 1 is a side view in elevation of apparatus embodying my invention; Fig. 2, a broken top plan view; Fig. 3, a broken enlarged sectional detail view showing the blending plate or tray suspended upon the weigh can; Fig. 4, a broken front view in elevation of the structure shown in Fig. 3; Fig. 5, a broken top view in elevation of a modified form of blending plate or tray embodying my invention; Fig. 6, a broken vertical sectional view of the structure shown in Fig. 5; and Fig. 7, a broken front view in elevation of the structure shown in Fig. 6.

In the illustration given in Figs. 1 to 4, inclusive, 10 designates a dump can having its bottom provided with a strainer and supported within the weigh can 11. The weigh can 11 is provided with a rear casing wall 12 and forwardly from the wall at a spaced distance is a transverse bar or strut 13. Since the weigh can and dump can are of well-known construction, a further detailed description is believed unnecessary. The dump can 11 is provided with the usual valve opening in its bottom closed by the usual valve, and upon the opening of the valve the milk flows from the dump can into a receiver 14.

In the structure adjacent the dump can and weigh can, there is illustrated in Figs. 1 and 2 a frame 15 equipped with a can rest 16 which assists in the dumping of the can. Over the dump can extends a guide 17 which leads laterally to the platform 18 of a can-washing machine 19. All of such structure is old and well-known and is set out herein merely to illustrate a normal operation of the dump can 10 and weigh can 11.

As already stated, the dump can 10 is ineffective for stirring the milk within the weigh can because the mass of openings in the strainer of the weigh can break the force of the stream of milk poured into it so that the milk that flows from the dump can is formed into a mass of vertical small streams that fall without stirring effect upon the surface of the milk below. I have discovered that this mass of relatively small streams can be regathered and concentrated into a heavy torrent which, when discharged into the milk body, stirs it from the bottom to the top thereof and produces an automatic blending of the butterfat with the milk. It is apparent that this result can be achieved through various types of structures.

In the structure illustrated best in Figs. 1, 3 and 4, a blending plate or tray 20 is equipped at its rear with a hook strap 21 adapted to extend over and engage the rear wall 12 of the weigh can 11. A U-shaped strap member 22 having hooks at its ends is extended over the cross strut 13 of the weigh can and serves to support the tray 20 at an inclination, as illustrated best in Fig. 3. If desired, the strap may be omitted and the plate supported upon the weigh can by other means.

I prefer to collect the discharged milk streams in a single heavy stream for discharge into the milk body and to provide the member 20 with inwardly and downwardly tapering sides 23. Thus, the collected milk is converged into a heavy stream near the center of the weigh can and is discharged in a heavy body into the body of milk below to effect the desired blending of the milk fat with the milk.

In the cleaning operations, the tray 20 can be lifted out of its position together with the suspension strap 22 and these parts may be separately washed along with the dump can.

In the modification illustrated in Figs. 5 to 7, inclusive, the structure is the same as illustrated in Figs. 1 to 4 except that the blender plate or tray 20ᵃ is provided near its top with a rectangular slot 24. The slot 24 divides the falling stream into two bodies, the forward stream being collected in the tray 20ᵃ and discharged in a heavy stream from the forward end of the tray or blending plate. The second stream falls from the strainer directly through the rectangular slot 24 where it strikes the body of milk at the rear portion of the elongated weigh can 11. The weigh can 11 has a bottom wall 25 which inclines rearwardly and upwardly so that the shallowest part of the liquid body is usually near the rear portion of the weigh can. Thus, the rearmost portion of the milk is stirred by the portion of the milk stream leaving the strainer at the highest point thereof.

It will be understood that for some milk cans, it is desirable to omit the slot 24 altogether and to employ the structure as shown in Figs. 1 to 4, inclusive, which effectively blends the butterfat throughout the entire weigh can. For other structures, depending upon the size or elongation of the weigh can, it is desirable to use the rectangular slot 24 in the tray 20ᵃ as shown in Figs. 5 to 7, inclusive. It will be understood that various modifications may be made in the utilizing of the foregoing structures to give the desired blending effect with respect to weigh cans of different types and contours.

The side walls of the plate prevent the spreading out of the milk and, in the more specific illustration given, actually hem in the milk to form a narrow heavy stream. By providing the blender plate with parallel walls or walls that taper inwardly, the small streams of liquid which normally have little force are accumulated upon the blender plate into a heavy stream which falls from the lower end of the plate into the body of milk to produce a heavy churning action. The blender plate may be inclined toward either end of the tank, or, if desired, may be turned laterally. Since most weigh cans are oblong or rectangular in shape, a longitudinal pitch of the blender plate downwardly toward one end is preferable.

While in the foregoing specification, I have set forth specific illustrative structures in considerable detail for the purpose of illustrating an embodiment of the invention, it will be understood that such details of structure may be varied widely by those skilled in the art without departing from the spirit of my invention.

I claim:

1. In combination with a strainer and a weigh can therebelow, the weigh can having its bottom wall inclined downwardly and forming, when filled with liquid, a deep end and a relatively shallow end, a blender plate providing a tray below said strainer to collect the milk passing downwardly therethrough, said tray being supported in a downwardly inclined direction with the lower discharge end of the tray toward the deep end of said weigh can, said tray having side walls extending from the upper portion of the tray to the lower portion in a non-diverging direction, said strainer being positioned above the upper end portion of said tray and said tray extending below said strainer throughout the length thereof to receive all of the streams of milk falling from said strainer and collecting the same to discharge them in a heavy single stream into the body of milk at the deep end of said weigh can.

2. In combination with a strainer and a weigh can therebelow, a blender plate providing a tray below said strainer to collect the milk passing downwardly therethrough, said tray being supported in a downwardly inclined direction with the lower discharge end of the tray toward an end of said weigh can, said tray having side walls extending from the upper portion of the tray to the lower portion in a non-diverging direction, said strainer being positioned above the upper end portion of said tray and said tray extending below said strainer throughout the length thereof to receive all of the streams of milk falling from said strainer and collecting the same to discharge them in a heavy single stream into the body of milk at said end of the weigh can.

3. In combination with a strainer and a weigh can therebelow, a blender plate providing a tray below said strainer to collect the milk passing downwardly therethrough, said tray being supported in a downwardly inclined direction with the lower discharge end of the tray toward an end of said weigh can, said tray having side walls extending in converging relation from the upper portion of the tray to the lower portion thereof, said strainer being positioned above the upper end portion of said tray and said tray extending below said strainer for receiving the streams of milk falling from said strainer and collecting the same to discharge them in a heavy single stream into the body of milk at said end of the weigh can.

VERGIL SCHWARZKOPF.

References Cited in the file of this patent

UNITED STATES PATENTS

| Number | Name | Date |
|---|---|---|
| 1,900,359 | Miller | Mar. 7, 1933 |
| 2,082,819 | Beccard | June 8, 1937 |
| 2,240,103 | Textor et al. | Apr. 29, 1941 |

FOREIGN PATENTS

| Number | Country | Date |
|---|---|---|
| 6,402 | Great Britain | Apr. 5, 1900 |
| 17,968 | Great Britain | Sept. 25, 1893 |
| 25,406 | Great Britain | Nov. 1, 1910 |